United States Patent [19]
Miyajima et al.

[11] Patent Number: 5,931,070
[45] Date of Patent: Aug. 3, 1999

[54] PUNCH PRESS SYSTEM AND ITS CONTROL METHOD

[75] Inventors: Keiichiro Miyajima; Teruo Masuda, both of Yamanashi, Japan

[73] Assignee: Fanuc., Ltd., Yamanashi, Japan

[21] Appl. No.: 08/793,478

[22] Filed: Feb. 27, 1997

[30] Foreign Application Priority Data

Jun. 27, 1995 [JP] Japan ................................... 7-160239

[51] Int. Cl.[6] .............................. B26D 3/00; B26D 5/20; B26F 1/14
[52] U.S. Cl. ................. 83/39; 83/76.1; 83/414; 83/684
[58] Field of Search .................. 83/13, 176.1, 684, 83/76.9, 76.7, 39, 414

[56] References Cited

U.S. PATENT DOCUMENTS

| | | | |
|---|---|---|---|
| 3,979,985 | 9/1976 | Daniels | 83/414 |
| 4,257,000 | 3/1981 | Friberg | 83/916 |
| 4,628,578 | 12/1986 | Yajima | 83/371 |
| 5,298,006 | 3/1994 | Miyajima | 83/39 |
| 5,299,477 | 4/1994 | Miyajima | 83/76.7 |
| 5,333,525 | 8/1994 | Schlegel | 83/917 |
| 5,588,344 | 12/1996 | Chun | 83/76.9 |

FOREIGN PATENT DOCUMENTS

| | | |
|---|---|---|
| 59-212135 | 12/1984 | Japan . |
| 4-100697 | 4/1992 | Japan . |
| 5-169151 | 7/1993 | Japan . |
| 8-108300 | 4/1996 | Japan . |

*Primary Examiner*—M. Rachuba
*Assistant Examiner*—Sean Pryor
*Attorney, Agent, or Firm*—Staas & Halsey

[57] ABSTRACT

A table for fixing a workpiece is driven and controlled by a position control means in a CNC unit through servo motors. Approach of a press tool to the workpiece is started by a press operation control means in the CNC unit through a servo motor at the time prior to the time, at which the position control of the table is completed, by predetermined time. Afterward, the press tool is controlled according to operation data stored in a press operation storage means in the CNC unit.

8 Claims, 6 Drawing Sheets

PUNCH PRESS SYSTEM AND ITS CONTROL METHOD

FIELD OF THE INVENTION

This invention relates to a punch press system comprising a type of punch press whose press operation is enabled by a servo motor, and a CNC unit (a computerized numerical control unit) for controlling the servo motor, and further, to a method of controlling such a punch press system.

DESCRIPTION OF THE RELATED ART

To control the press operation of a punch press by a CNC unit, first, a table on which a workpiece is fixed is positioned. After positioning of the table is completed, a pressing command signal is sent to the punch press. When the punch press receives this pressing command signal, the punch press rotates a flywheel to operate a ram of the punch press, and executes press work by a press tool attached to the ram.

Incidentally, the speed-up of press work by the punch press is needed. However, since a conventional punch press performs press operation in accordance with the rotation of the flywheel, the command for operation through a programmable controller is required. Further, since the working speed of the flywheel itself is delayed, the response of press operation to a command is degraded. Furthermore, since the working speed of the flywheel is substantially fixed, only simple operation is allowed.

To solve such defects, a punch press using a servo motor to control press operation is provided. However, in this machine, a controller dedicated to press operation is required to be provided separately from a CNC unit, so that the cost is increased. Further, since a command to the servo motor is sent from the CNC unit through a controller for the servo motor, the speed-up of processing rate is limited.

SUMMARY OF THE INVENTION

It is an object of the present invention to provide a punch press system and its control method, wherein a press tool provided to a punch press is operated by a servo motor controlled by a CNC unit. The positioning of a table for loading a workpiece and the driving of the press tool are controlled by a common CNC unit, and as a result, press operation can be carried out at a low cost and at a high speed.

To achieve the above object, a punch press system according to the present invention comprises a punch press and a CNC unit. The punch press includes a ram having an end to which a tool for pressing and punching a workpiece is attached, a servo motor for press control the linear movement of the ram, a table on which the workpiece is to be fixed, and a servo motor for table for positioning the table, while the CNC unit includes a position control means for controlling the position of the table by operating the servo motor for table according to a working program, a press operation data storage means for storing an operation command to be issued to the servo motor for press, and a press operation control means for reading out the operation command stored in the press operation data storage means and controlling the servo motor for press according to the read-out operation command. In addition, the position control means is provided with a function for issuing a read-out start signal to the press operation control means at the time earlier by a predetermined time than the time, at which position control is completed in one working cycle, whereby, when the press operation control means receives the read-out start signal from the position control means, the press operation control means starts to read out the operation command for controlling the servo motor for press from the press operation data storage means.

The CNC unit in the punch press system according to the present invention controls the servo motor for table to drive the table on which a workpiece is fixed, and also controls the servo motor for press to drive the press tool of the punch press. A method of controlling the punch press system according to the present invention comprises the following steps: starting the position control of a table by driving a servo motor for table; starting the driving of a servo motor for press at the time which went back to the past from the time when position control for the table is completed, by the time which is close to but not execeeding approach time required for the press tool to approache to a workpiece from its home position; lowering the press tool halfway at a rapid acceleration according to an operation pattern stored in a CNC unit during approach stroke to the workpiece, which is the process for starting operation; lowering the press tool to an approach end position while gradually reducing its lowering speed; lowering the press tool at a low substantially fixed speed during press operation following the approach; lowering the press tool at rapid acceleration again during punching operation after press operation is finished; lifting the press tool halfway at rapid acceleration during return operation for returning to the home position after punching operation is completed; and gradually reducing the lifting speed to thereby stop the press tool at its home position.

According to the punch press system of the present invention as described above, press operation data created in advance is read out according to the position control of the table, and the servo motor is controlled according to the read-out press operation data to control the operation of the press. Using the present invention it is possible to configure a punch press system which has a simple structure and is excellent in operation.

BEST MODE FOR CARRYING OUT THE INVENTION

Figure 1:
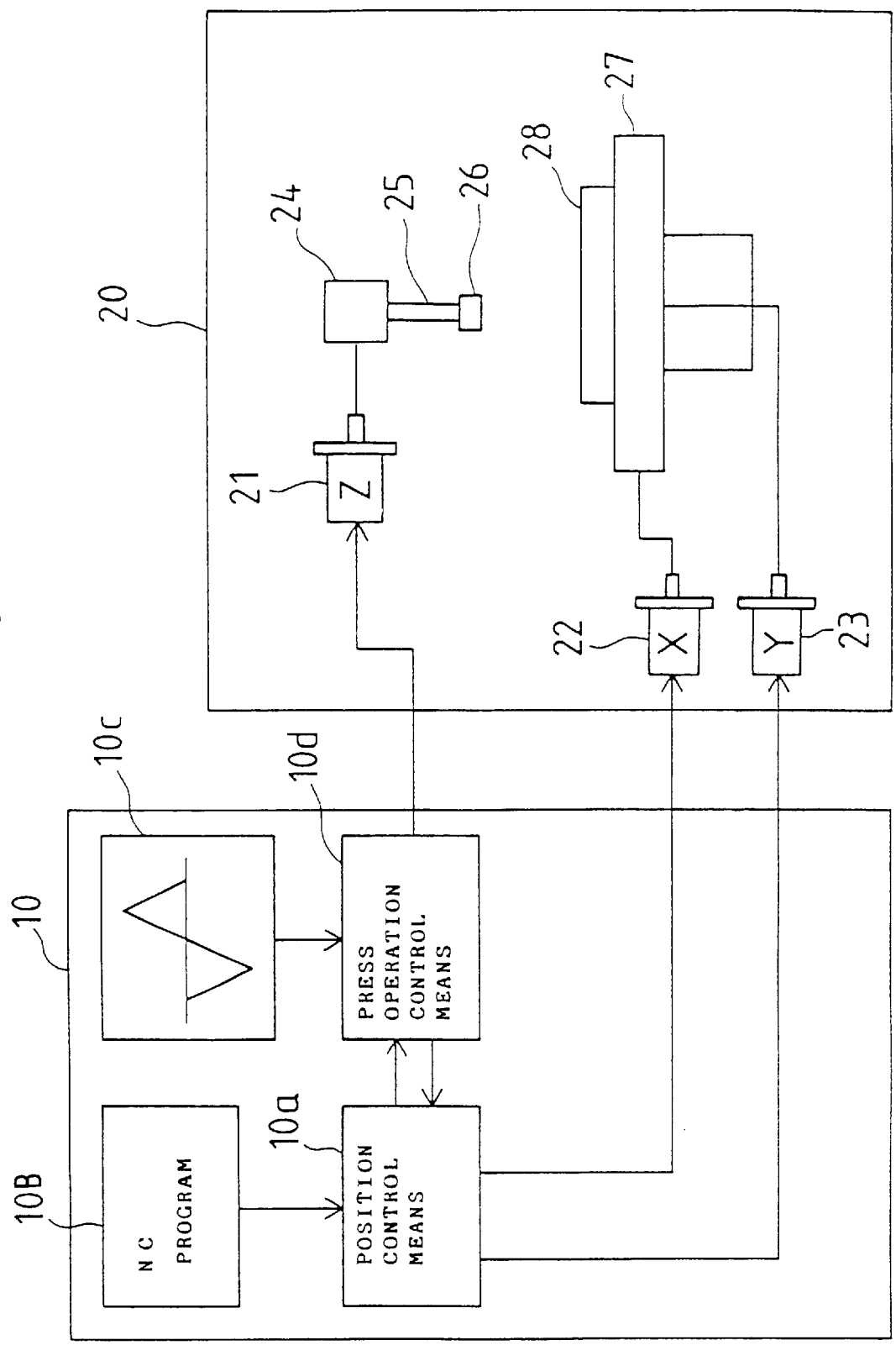
FIG. 1 is a view schematically showing a punch press system in an embodiment according to the present invention.

As shown in FIG. 1, a punch press system comprises a CNC unit 10 and a punch press 20, in which its operation is controlled by the CNC unit 10.

The punch press 20 includes an XY table 27 for loading and fixing a workpiece 28, an X-axis servo motor 22 for moving the XY table 27 in the direction of X-axis, a Y-axis servo motor 23 for moving the XY table 27 in the direction of Y-axis, a ram 25 having the end to which a tool 26 is attached, and a Z-axis servo motor 21 for moving the ram 25 through a power transmission section 24 in the direction (in the direction of Z-axis) perpendicular to the surface (the XY plane) on which table 27 moves.

The CNC unit 10 includes a position control means 10a, which moves and controls the position of the XY table 27 on the XY plane by issuing a command to the X-axis servo motor 22 and the Y-axis servo motor 23 according to a working program (an NC program) 10b. Further, the CNC unit 10 includes a press operation data storage means 10c capable of storing the data to determine a pattern in one cycle of press operation by the punch press 20, and a press operation control means 10d capable of reading out press operation data, which is previously stored in the press operation data storage means 10c from the press operation data storage means 10c in response to the output from the position control means 10a, and capable of controlling the Z-axis servo motor 21 according to the read-out operation data.

Figure 2:
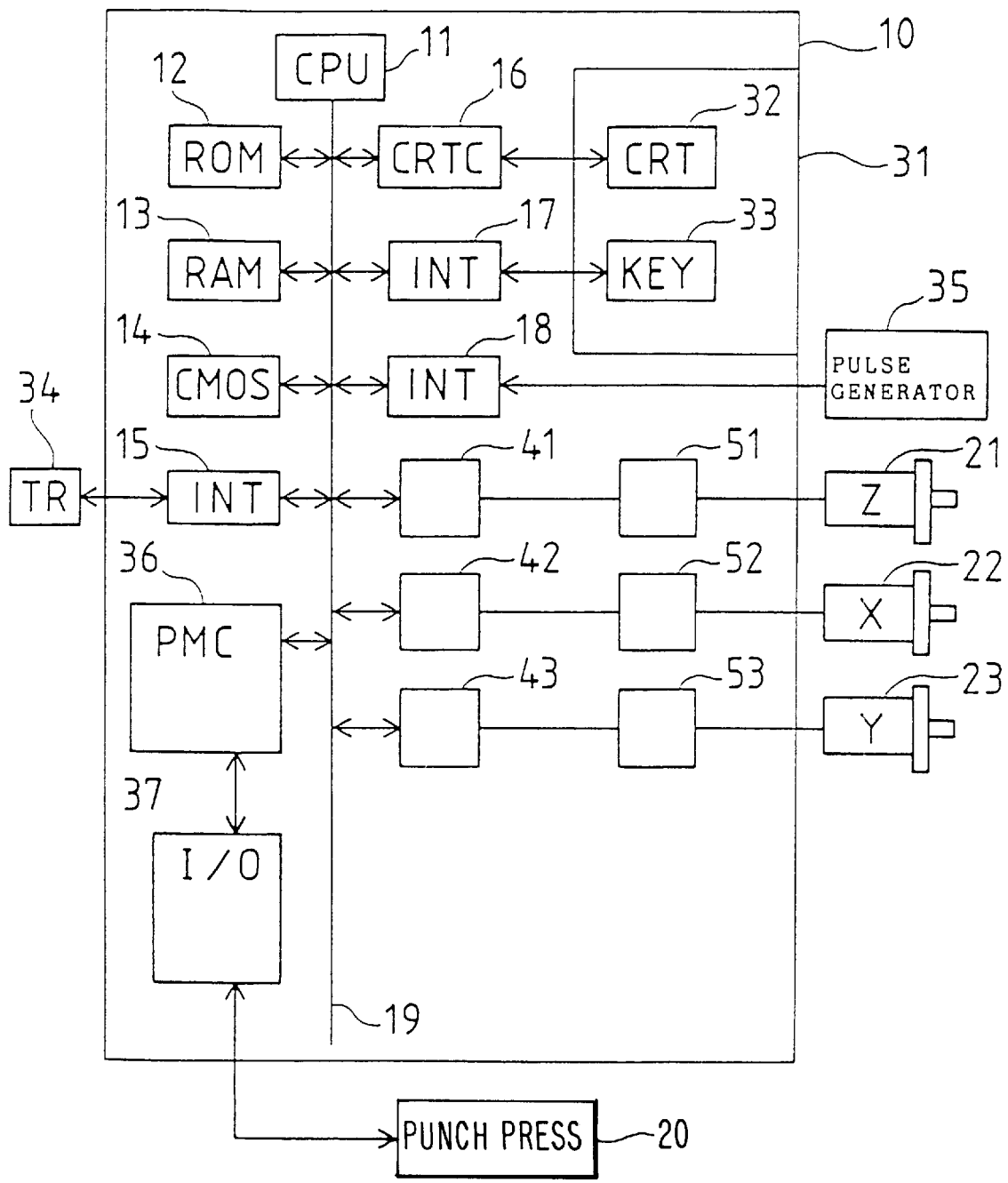
FIG. 2 is a block diagram showing the hardware configuration of a CNC unit constituting the punch press system shown in FIG. 1.

A description will now be given of the hardware configuration of the CNC unit 10 with reference to FIG. 2. A processor 11 is connected, through a bus 19, to each of ROM 12 for storing a system program, RAM 13 for temporarily storing computational data and display data or the like, CMOS 14 for storing the correction quantity of tool, the error correction quantity of pitch, a working program and parameters or the like, an interface 15 for external device, a programmable machine controller (PMC) 36 for controlling the punch press, a graphic control circuit 16, an interface 17 for connecting a key board 33, an interface 18 for connecting a manual pulse generator 35 and axis control circuits 41 to 43 for receiving a command for moving each axis and outputting the received command to servo amplifiers 51 to 53.

The processor 11 reads out the system program stored in ROM 12 through the bus 19, and controls the whole CNC unit 10 according to the read-out system program. Incidentally, SRAM or the like is used for RAM 13.

Press operation data created beforehand is also stored in CMOS 14 along with the correction quantity of tool, the error correction quantity of pitch, the working program and the parameters. That is, CMOS 14 the press operation data storage means 10c shown in FIG. 1. Since this CMOS 14 is backed up by a battery (not shown), data stored in CMOS is held as it is even if the power supply to CNC unit 10 is interrupted.

A paper tape reader, a paper tape puncher and an external device 34 such as a printer are connected to the interface 15 for the external device. A working program is read from the paper tape reader to the interface 15, and the interface 15 is able to output a working program edited in the CNC unit 10 to the paper tape puncher.

The graphic control circuit 16 converts digital data such as the current position of each axis, an alarm, a parameter and image data into an image signal and outputs the image signal. This image signal is sent to a display 32 of a manual input unit with a display (CRT/MDI unit) 31 and is displayed on the display. The interface 17 receives data through the keyboard 33 in CRT/MDI unit 31 and sends the received data to the processor 11.

The interface 18 is connected to the manual pulse generator 35 and receives a pulse from the manual pulse generator 35. The manual pulse generator 35 is mounted on a mechine control panel and is used for manually moving the punch press 20 with accuracy.

The programmable machine controller (PMC) 36 is built in the CNC unit 10 and controls the punch press according to a sequence program created in the form of a random-access discrete address (RADA). That is, the programmable machine controller converts M function, S function and T function (not shown) commanded by a working program into a signal required for the punch press according to a sequence program, and outputs the signal to the punch press through an I/O unit 37. This output signal drives a magnet or the like in the punch press and operates a hydraulic valve, a pneumatic valve, an electric actuator or the like. The programmable machine controller receives a signal from a limit switch for the punch press and from a switch or the like on the mechanical control panel, performs the processing required for the signal and sends the processed signal to the processor 11.

The axis control circuits 41 to 43 receive a command for moving each axis (X-axis, Y-axis and Z-axis) from the processor 11 and outputs the received command for each axis to the servo amplifiers 51 to 53. Each of the servo amplifiers 51 to 53 receives this command and drives the corresponding servo motor 21 to 23 for each axis. A pulse coder (not shown) for detecting a position is built in each of the servo motors 21 to 23, and the position signal is fed back from this pulse coder as a pulse train. A speed signal can be generated by F/V (frequency/velocity) conversion of this pulse train. However, in FIG. 2, the feedback line of this position signal and the feedback of a speed are omitted.

A description will now be given of the specific processing for the control of the punch press in this embodiment.

Figure 3:
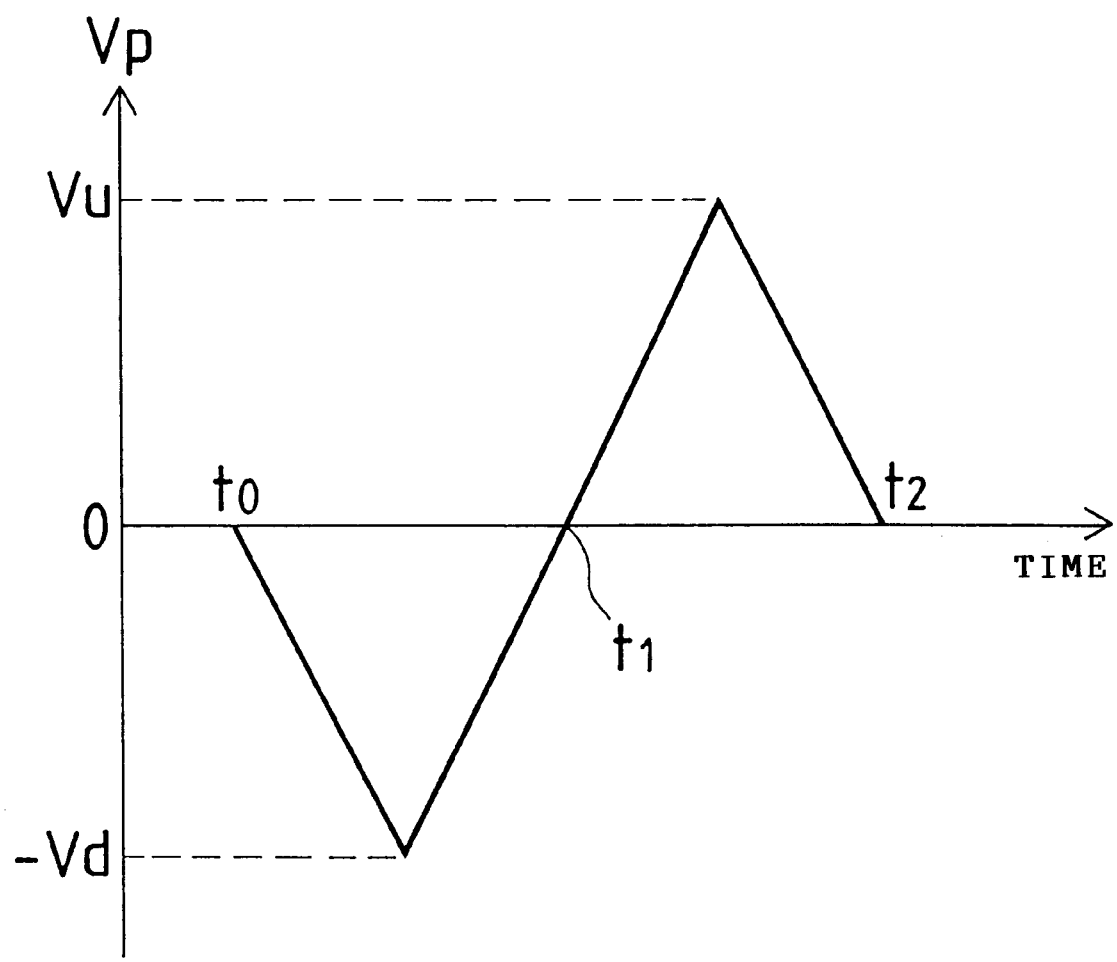
FIG. 3 shows a pattern of one cycle of press operation by a punch press constituting the punch press system shown in FIG. 1.

FIG. 3 is a graph showing an embodiment of an operational pattern of press operation in one cycle between approach of the press tool 26 from its home position to the workpiece 28 and return to the home position through pressing and punching. In FIG. 3, a horizontal axis represents time, and a vertical axis represents speed Vp at which the press tool 26 is moved in the direction of Z-axis (the amount of movement during every predetermined period). According to the pattern shown in FIG. 3, the press tool 26 is rapidly accelerated from the time t0, at which press operation is started (the time at which approach is started), up to the maximum lowering speed (−Vd). Then, the press tool 26 is decelerated until the press tool reaches an approach end position, and continues decelerated lowering movement at the following stage of the pressing workpiece and the subsequent stage of punching workpiece. When the punching work is finished in this decelerated lowering process (time t1), the movement of the press tool 26 is changed from the lowering movement to lifting movement (return movement). Then, the press tool 26 is rapidly accelerated again up to the maximum lifting speed (Vu). Then, the press tool 26 is decelerated while returning to the home position and is stopped (time t2). Data for determining such operational pattern of the punch press is stored in CMOS 14 in the form of the amount of movement during each predetermined period (each interpolation period or each period including two or more interpolation periods). That is, the press operation data storage means 10c shown in FIG. 1 is constituted by CMOS 14 in the CNC unit 10 shown in FIG. 2. This data is read out every predetermined period (interpolation period), and is sent to the servo amplifier 51 through the axis control 41 for press to rotate the servo motor 21 for Z-axis through the angle corresponding to the movement during the predetermined period (interpolation period). As a result, the press tool 26 is operated according to a preset operational pattern.

Figure 4:
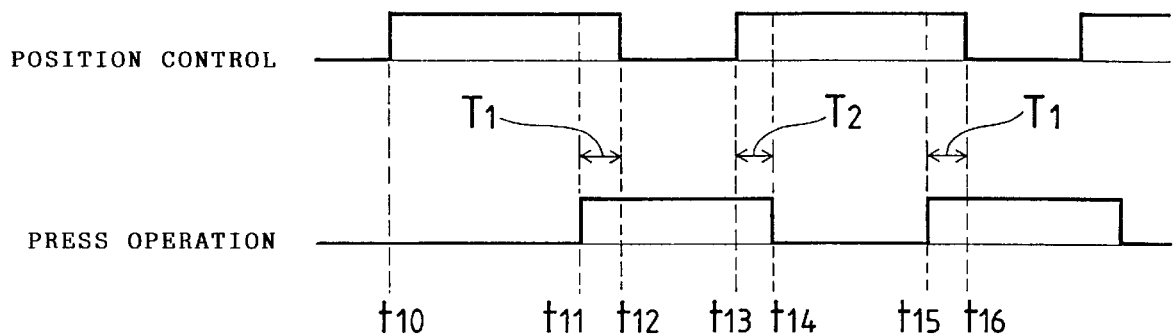
FIG. 4 shows the time correlation between operation positioning a workpiece and press operation.

A description will now be given of the cooperative operation of the positioning of the XY table (the workpiece 28) and the press operation of the tool 26 attached to the ram 25 with reference to a time chart shown in FIG. 4. In press working, it is necessary to move the table 27 to determine the position of the workpiece 26 and the position of the press tool 26 relatively. In this embodiment, press operation is started at the time T11 earlier, by predetermined time T1, than the time T12 at which positioning is completed. This predetermined time T1 is set on the basis of the operating characteristics or the like of the operational pattern shown in FIG. 3 so that the predetermined time T1 is within the approach time of the press tool 26 and as close to the approach time as possible. In this method of setting, the time T1 may peviouly be stored in a memory as a parameter or may be calculated as required.

When press operation is finished, next positioning is started at the time T13 which is earlier than press operation finish time t14 by predetermined time T2. This predetermined time T2 is set on the basis of the operating characteristics or the like of the operational pattern shown in FIG. 3 so that the predetermined time is a time starting from a time when the press tool 26 is separated from the workpiece 28 and ending when the press tool is returned to its home position, that is, the predetermined time is in the range not exceeding return time and as close to the return time as possible. For setting these predetermined times T1 and T2, they may be either previously stored in a memory as a parameter or calculated as required.

Figure 5:
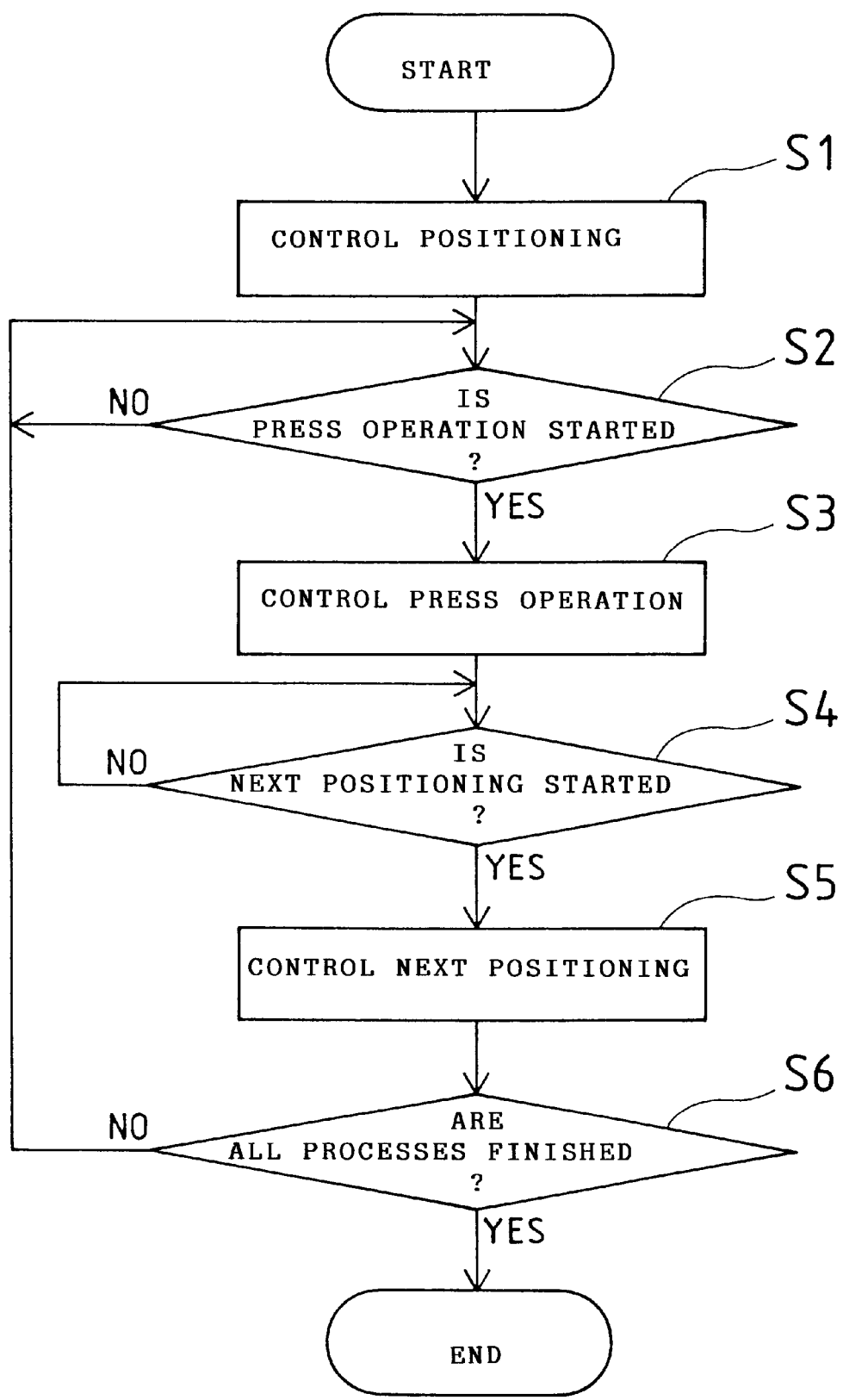
FIG. 5 is a flow chart showing a processing procedure of a processor of the CNC unit for executing press operation.

FIG. 5 is a flow chart showing a processing procedure by the processor 11 for executing such press operation.

First, the processor 11 reads out the working program from CMOS 14 constituting the press operation data storage means 10c, and starts positioning control according to its first block (Step S1). In positioning control, the number of interpolation periods and the quantity of movement distributed for each interpolation period are calculated according to a movement command written in the present (first) read-out block (concering the X- and Y-coordinate values of a movement start point and a movement end point and a moving speed). The number P1 of interpolation periods, equivalent to the time from positioning control start time t10 till press operation start time t11, is obtained by converting the time from the start of positioning control (time t10) till the end of positioning control (time t12) into the number of interpolation periods and then subtracting the number of interpolation periods equivalent to the time T1 from the number thus converted.

At the same time that positioning control is started, the number of interpolation periods, successively executed, is counted up (Step S2). Processing in this step is repeated until the count reaches P1, that is, the number equivalent to the time from the positioning control start time t10 to the press operation start time t11. When the count value reaches P1 (that is, the current time reaches t11), data for determining the operational pattern of the punch press is read out from CMOS 14 as the press operation data storage means 10c for each predetermined period (interpolation period), and the punch press is operated according to the read-out data (Step S3). Before the operation of reading out data from CMOS 14 is started, the number Q1 of predetermined periods (interpolation periods) equivalent to the time from the press operation start time t11 till positioning control start time t13 written in the next block is obtained by obtaining the time from the start of press operation (time t11) till the end of the press operation (time t14) on the basis of the number of predetermined periods (interpolation periods) and then subtracting from the foregoing number the number of predetermined periods (interpolation periods) equivalent to the time T2 from the number thus obtained.

At the same time that press operation is started, the number of predetermined periods (interpolation periods) in which data is successively read out from CMOS 14 is counted up (Step S4). Processing in this step is repeated until the count value reaches Q1, that is, the number equivalent to the time from the press operation start time t11 to the following positioning start time t13. When the count value has reached Q1 (that is, when current time has reached t13), positioning control is started (Step S5). the positioning control is the last one and no following press operation is set, the number of respective interpolation periods and the amount of movement for each interpolation period are calculated according to a movement command of X-and Y-axes written in the currently read block, and positioning control is started based on the result of calculation. When positioning control is finished, the whole process is finished simultaneously (Step S6). On the other hand, if the positioning control is not the last one, the processor 11 executes the same positioning processing as that in Step S1, and thereafter, returns to Step S2 to start press operation.

In the above embodiment, the time from the start of positioning control till the end thereof (the time from the time t10 till the time t12) and the time from the start of press operation till the end thereof (the time from the time t11 till the time t14) are obtained by counting the number of periods. Otherwise, the time R1 (the time from the time t10 till the time t12), at which positioning control is executed, is calculated on the bases of a moving speed and the amount of movement in the movement command, and the time, at which the time R1-T1 is measured by the timer that is started at the positioning control start time (the time t10), may be set as the press operation start time (the time t11). Further, time S1 (the time from the time t11 till the time t14), at which press operation is executed, is obtained from the data stored in CMOS 14 for determining the operational pattern of the punch press, and the time, at which time S1-T2 is meared by the timer that is at the press operation start time (the time t11), may be set as the positioning control start time (the time t13).

As described above, in this embodiment, since the press tool 26 is operated by the servo motor controlled by the CNC unit 10, it is possible to configure a punch press system which has a simple structure and is excellent in responsibility. As a result, press operation is able to be executed at a high speed even at a low cost.

Further, in this embodiment, press operation is started at the time t11 earlier, by the predetermined time T1, than the time t12 at which positioning is completed, and the next positioning operation is started at the time t13 earlier, by the predetermined time T2 than the time t14 at which press operation is finished. Therefore, waiting time between the completion of positioning control and the start of press operation and waiting time between the start of press operation and the start of positioning control in a working cycle are reduced to a largest possible extent. As a result, high speed press operation is made possible. Furthermore, in this embodiment, the pattern of press operation is stored in the form of the data of movement amount for each predetermined period corresponding to one interpolation period or two or more interpolation periods, and the data is read out for each predetermined period and is outputted to the servo motor. As a result, complicated operation is not required, and higher speed operation is possible.

One embodiment of the pattern of press operation is in FIG. 3; however, a plurality of other patterns may be prepared and may be selected according to a command or the like by an operator. The time from the start of press operation till the start of the next positioning control (the time from the time t11 till the time t13) or the number of predetermined periods (interpolation periods) corresponding to such a time may also be stored along with the data for determining the pattern. In this case, a caluculation for obtaining the time of press operation or the number of interpolation periods, prior to the start of press operation, would not require much time.

A command for starting positioning control may also be stored, when the pattern of press operation is set, in an address in which a movement command (a command for movement amount in a predetermined period) corresponding to the time t13, at which the next positioning control is started, is stored.

Figure 6:
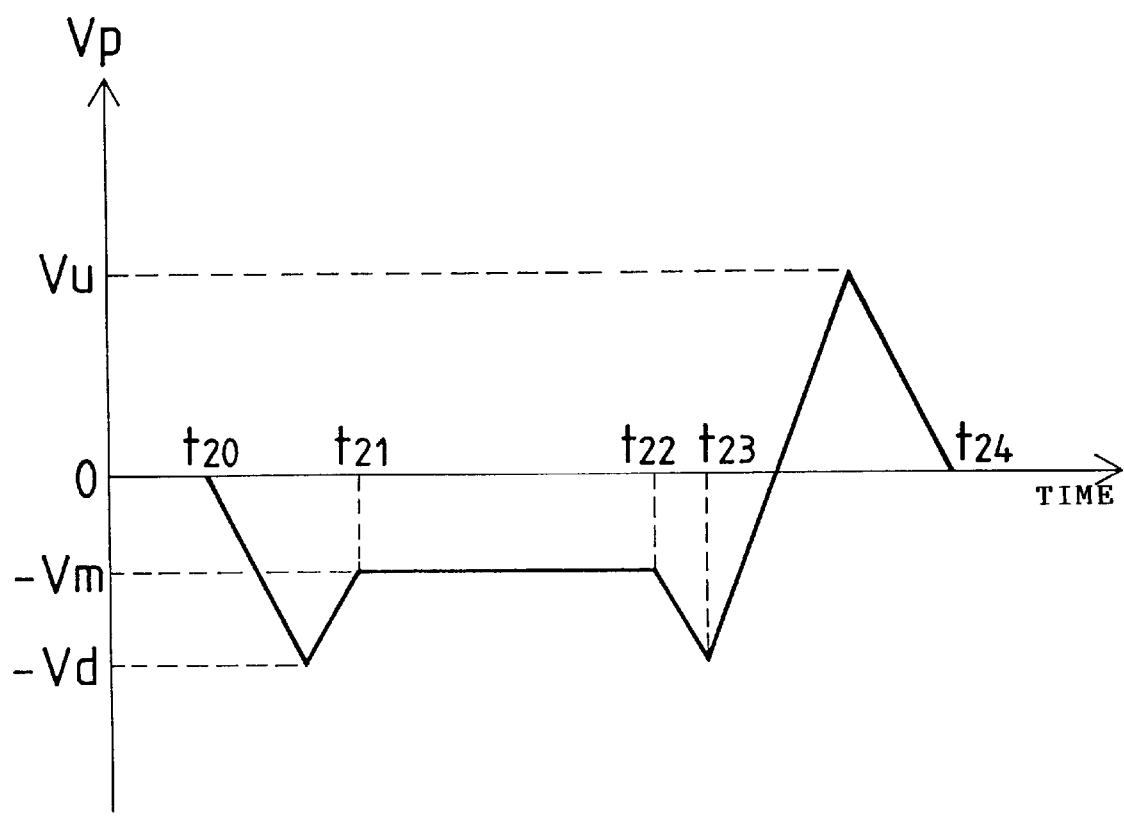
FIG. 6 shows a pattern different from that shown in FIG. 3.

FIG. 6 is a graph showing an operational pattern different form the operational pattern of press operation shown in FIG. 3, though the vertical and horizontal axes are the same as those in FIG. 3. According to this operational pattern, first, the press tool 26 is accelerated from approach start time (time t20) up to the maximum lowering speed (−Vd) and is then decelerated to complete its approach stroke (time t21). Afterward, the press tool 26 presses the workpiece 28, while maintaining the lowering speed (−Vm) of the time when approach was completed. Then, when work for punching the workpiece 28 is started (time t22), the lowering speed is accelerated again, and the press tool punches the workpiece with the lowering speed accelerated and punching is completed (time t23). The press tool 26 which has finished punching is rapidly accelerated in the return direction (in the lifting direction) up to the maximum lifting speed (Vu). Then, the press tool is decelerated, while returning to the home position and is stopped (time t24). As described above, the press tool 26 is operated at a low fixed lowering speed (−Vm) between the end of approach (the time t21) and the start of the operation for punching the workpiece (the time t22), so that the shock at the time of the contact between the workpiece 28 and the press tool 26, as well as the noise, can be reduced. On the other hand, approach, punching and retreat are performed at a high speed, so that working time can be reduced.

As described above, according to the present invention, the press operation data created in advance is read out according to the positioning control of the table, and the operation of the press tool is controlled by controlling the servo motor for press according to the read-out press operation data, so that it is possible to configure a punch press system which has a simple structure and is excellent in responsibility. Therefore, press operation can be executed at a high speed, as well as at a low cost.

We claim:

1. A punch press system in which the operation of a punch press is controlled by a numerical control unit, said punch press system comprising:

a ram having an end to which a tool for pressing and punching a workpiece is attached;

a servo motor for said punch press to control a linear movement of the ram;

a table for fixing the workpiece; and a servo motor for said table to position said table; and said numerical control unit comprising:

a position control means for controlling the position of said table by operating said servo motor for said table according to a working program;

a press operation data storage means for storing an operation command to be issued to said servo motor for said punch press; and a press operation control means for reading out the operation command stored in said press operation data storage means and for controlling said servo motor for said punch press according to the operation command;

wherein at a set time prior to a time at which positioning to a commanded press position is completed, by a predetermined time, said press operation control means starts to control press operation.

2. A punch press system according to claim 1, wherein at said set time prior to the time at which press operation is completed in one working cycle, by the predetermined time, said position control means starts to control positioning of said table in another working cycle.

3. A punch press system in which the operation of a punch press is controlled by a numerical control unit, said punch press system comprising:

a ram having an end to which a tool for pressing and punching a workpiece is attached;

a servo motor for said punch press to control a linear movement of the ram;

a table to fix the workpiece; and a servo motor for said table to position said table; and the numerical control unit comprising:

a position control means for controlling the position of said table by operating said servo motor for said table according to a working program;

a press operation data storage means for storing an operation command to be issued to said servo motor for said punch press; and a press operation control means for reading out the operation command stored in said press operation data storage means, and for controlling said servo motor for said punch press according to the operation command;

wherein said position control means is provided with a function for issuing a read-out start signal to said press operation control means at a time prior to a time at which position control is completed in one working cycle, by a predetermined time; and when said press operation control means receives the read-out start signal from said position control means, said press operation control means starts to read out the operation command for controlling said servo motor for said punch press from said press operation data storage means.

4. A punch press system according to claim 3, wherein said press operation control means is provided with a function for issuing a control start signal to said position control means at the time prior to the time at which press operation is completed in one working cycle, by the predetermined time; and when said position control means receives the control start signal from said press operation control means, said position control means starts position control in another working cycle.

5. A punch press system according to claim 3, wherein the operation command stored in said press operation data storage means and issued to said servo motor for said punch press includes an amount of movement of said ram for each unit time.

6. A punch press system according to claim 5, wherein during said unit time an interpolation period for which a CNC unit issues a command to the servo motor according to a working program.

7. A punch press system according to claim 3, wherein a plurality of patterns of operation commands to be stored in said press operation data storage means and to be issued to said servo motor for a punch press are created beforehand; and said press operation data storage means is provided with a function for selecting one pattern specified in the working program out of the plurality of patterns.

8. A method of controlling a punch press system, in which a first servo motor controlled by a CNC unit drives a table on which a workpiece is loaded and fixed and a second servo motor controlled by said CNC unit drives a press tool of a punch press comprising the steps of:

starting the position control of the table by driving the first servo motor for said table, and then starting the driving of the second servo motor for said punch press at a time prior to the time when the position control for the table is completed, by the time which is close to but not exceeding an approach time required for the press tool to approach to a workpiece from its home position;

lowering the press tool halfway at rapid acceleration according to an operational pattern stored in the CNC unit during approach to the workpiece started at the start of operation, and then lowering the press tool to an approach end position while gradually reducing a lowering speed;

lowering the press tool at a low substantially fixed speed during press operation following the approach; and lowering the press tool at rapid acceleration again during punching operation after press operation is finished, and then lifting the press tool halfway at rapid acceleration during return to the home position after the punching operation is completed, and afterward, stopping the press tool at the home position, while gradually reducing a lifting speed.

* * * * *